(12) United States Patent
Hill

(10) Patent No.: US 6,617,817 B2
(45) Date of Patent: Sep. 9, 2003

(54) ELECTRICAL TIME CONSTANT COMPENSATION METHOD FOR SWITCHED, VOLTAGE-MODE DRIVER CIRCUIT

(75) Inventor: John P. Hill, Nederland, CO (US)

(73) Assignee: STMicroelectronics, Ltd., Carrollton, TX (US)

( * ) Notice: Subject to any disclaimer, the term of this patent is extended or adjusted under 35 U.S.C. 154(b) by 0 days.

(21) Appl. No.: 09/872,294

(22) Filed: Jun. 1, 2001

(65) Prior Publication Data

US 2002/0180392 A1 Dec. 5, 2002

(51) Int. Cl.[7] .............................................. G05B 11/01
(52) U.S. Cl. ........................ 318/560; 318/254; 318/432; 318/479; 360/73.01; 360/73.02; 360/73.03; 360/78
(58) Field of Search ................................. 318/254, 432, 318/479, 560; 360/73.01–73.03, 78

(56) References Cited

U.S. PATENT DOCUMENTS

| | | | | | |
|---|---|---|---|---|---|
| 4,622,499 A | * | 11/1986 | Squires et al. | .............. | 318/254 |
| 4,760,471 A | * | 7/1988 | Brush et al. | ............... | 360/10.2 |
| 5,521,772 A | * | 5/1996 | Lee et al. | ..................... | 360/75 |
| 5,532,566 A | * | 7/1996 | Burke et al. | ................ | 318/650 |
| 5,838,515 A | * | 11/1998 | Mortazavi et al. | ....... | 360/78.12 |
| 5,889,629 A | * | 3/1999 | Patton, III | .................... | 360/75 |
| 5,898,283 A | * | 4/1999 | Bennett | ....................... | 318/254 |
| 5,917,720 A | | 6/1999 | Galbiati | | |
| 6,282,046 B1 | * | 8/2001 | Houston et al. | ......... | 360/73.03 |

OTHER PUBLICATIONS

Carlo Vertemara, "12V Disk Drive Power Combo IC," Application Note, May 1999.
Stmicroelectronics, "Mozart, 12 V Disk Drive Spindle & VCM, Power & Control Combo," Sep. 1999.
Carlo Vertemara, "L6254–L6268–L6269 Application Note," Apr. 12, 1999.
Stmicroelectronics, "L7250 IC Design Specification Preliminary," Sep. 4, 2000.

* cited by examiner

*Primary Examiner*—Robert E. Nappi
*Assistant Examiner*—Tyrone Smith
(74) *Attorney, Agent, or Firm*—Lisa K. Jorgenson; William J. Kubida

(57) ABSTRACT

A power driver for driving a signal on a load using voltage-mode driver. A system processor generates commands indicating a programmed drive signal desired from the voltage-mode driver. A lead compensator determines a compensated command to compensate for an admittance function of the load. The compensated commands are coupled to the voltage-mode driver, such that the voltage-mode driver generates a voltage output based upon the compensated command.

23 Claims, 4 Drawing Sheets

ELECTRICAL TIME CONSTANT COMPENSATION METHOD FOR SWITCHED, VOLTAGE-MODE DRIVER CIRCUIT

BACKGROUND OF THE INVENTION

1. Field of the Invention

The present invention relates, in general, to driver circuits, and, more particularly, to systems and methods for compensating for electrical time constant of an inductive load with switched voltage-mode power drivers and other circuits in which an important system variable is controlling the current level in an inductive load.

2. Relevant Background

Switched power driver circuits are widely used to generate power suitable for driving loads such as motors. Switched power drivers turn on and off repetitively to supply regulated current in an efficient manner (i.e., with minimal switching loss). Switched power driver circuits are associated with driver circuits that control, for example, the magnitude (by means of the duty cycle of the on and off cycles), so as to supply a desired amount of power to a load. In a typical application, a power driver circuit is controlled by a system processor, often implemented as a microcontroller IC, that generates commands to the driver circuit. The driver circuit essentially turns on and off in response to the received commands. When on, the driver circuit supplies current to the load, and when off, the driver circuit cuts off current supply to the load.

Motor loads are inductive, making their behavior (e.g., speed and direction) related to the magnitude and polarity of the current supplied. The inductive nature of the load causes a lag or delay, referred to as an electrical time constant, in the current level change in the load caused by a change of voltage across the load terminals. Essentially, voltage across the terminals of an inductor can change instantaneously, however, current cannot change instantaneously. For precision motor control applications such as required in disk drive storage systems, this time constant delay can lead to positioning errors and slower performance.

For example, a typical application involves control of a voice coil motor (VCM) that controls position of a head assembly with respect to a disk surface in a hard disk drive. Slower transient variations in the load current caused by the electrical time constant translate into position errors. The disk drive system must compensate for the errors by waiting for the transient condition to subside before writing or reading data from the desired location.

Head position control is implemented by a servo control system. Early servo control systems for low density drives used open loop positioning using stepper motor technology. However, at higher densities closed loop solutions are required. Current disk drives, for example, obtain head position information directly from data contained on the disk surface. A track number, in the form of encoded binary data, is recorded at various locations about the disk surface and uniquely identifies each recording track on the disk. Servo position, in the form of sinusoidal burst signals staggered in position between adjacent tracks can be used to determine the position of the head with respect to a track centerline. The track number and servo burst are used to compute a position error signal (PES), which is fed into the electromechanical servo position system.

In operation, a disk drive controller generates a command to move the head to a particular location, and the command is translated into voltage signals applied to the VCM. The voltage signals, often called drive signals, may be linear or switched-mode. Switched mode drivers are also known as pulse width modulation (PWM), phase shift modulation (PSM) and other names. Switched-mode drivers can be implemented as current-mode (i.e., use a current minor loop) or as voltage-mode drivers. These switched mode drivers have the advantage of reducing the power dissipation to the driver devices and therefore allow smaller devices and packages. In a current mode driver, a feedback loop is typically used to compare the actual current applied to the VCM to the requested current. The applied signal is compared to the command to compute a current error signal (CES). The CES is used to modify the command value, so that the head eventually moves to the desired location and reduces the PES value.

In the case of the driver for a VCM in a disk drive, a typical circuit topology for the feedback loop is one that is termed a "Current Minor Loop" (CML). This refers to a feedback circuit that generates a signal that is proportional to or indicative of the current magnitude in the load. The "minor" loop term indicates that there is localized feedback in the driver circuit in contrast to the "major" loop that controls the head position. The current in the load is sensed by an external current sense resistor, for example, that is coupled in series with the load. This resistor is typically a high precision power resistor that is relatively expensive. The inductive nature of the load causes a lag or delay in the current level change in the load due to a change of voltage across the load terminals. With a CML, the voltage across the load is increased at a greater rate of change than the command by means of the feedback loop. This faster rate of change is controlled by a compensator stage within the loop and has limits imposed by stability criteria.

The voltage across the resistor is brought into a control IC through an additional pin. The measured voltage is compared to the presently requested command value and a corrected command value is applied to the power drivers to obtain a load current that is proportional to command value. This extra IC pin required to port in the resistor voltage is not desirable in highly integrated circuits due to an increase in package cost. Moreover, the extra IC pin displaces other functionality that could be implemented using the pin. As higher levels of circuit integration are desired and the reduction of external components and pins is desirable due to cost and circuit area constraints, the CML topology is undesirable.

One feedback topology that eliminates the need for the external current sense resistor and additional pin is a voltage-mode driver. Voltage mode power drivers refer to a class of control circuits that regulate the output voltage as opposed to output current. Voltage mode drivers are desirable because they require fewer device I/O pins to monitor and regulate the supplied power. Presently available switched voltage-mode power drivers do not sense the current in the load and therefore have no means to correct for lag in the current response caused by time constant related delays.

While voltage and current in an inductive load are related, a voltage-mode driver regulates current in the inductive load indirectly by monitoring and regulating the applied voltage. In this case, the average voltage output of the driver is proportional to the command value. When the load is purely resistive, the output average voltage value can be sensed and used to correct for changes caused by load impedance in a feedback method similar to the CML, but without the external current sense resistor and extra pin. However, as a result of inductive load impedance, the resulting current does not change instantaneously for a change in terminal voltage. Similarly, in capacitive loads the terminal voltage is not indicative of the load current.

The current change in an inductive load is exponential and the rate of this change is described by its electrical time constant ($\tau$). This value is calculated by dividing the inductance measured in Henries by the resistance measured in Ohms. The resulting time constant is in the units of seconds. The current, as a function of time, is $I(t)=Iss*(1-e^{(-t/\tau)})$ where Iss is the final steady state current, t is the time variable in seconds, and $\tau$ is the electrical time constant in seconds. In the frequency domain this same characteristic of an inductive load can be described in the admittance function, $I(t)/V(t)$, of the load. In that case the admittance decreases at the idealized corner frequency of $1/(2\pi\tau)$. For example, an actuator in a 2.5" disk drive could have a $\tau$ of 19.2 $\mu$S. The resulting lag corner frequency of the admittance function would be at 8.3 KHz. In the time domain, for a step in voltage, the current increases exponentially to 63% of the final Iss value in the time equal to one "tau". It is desirable to increase this current rate of change and the admittance corner frequency in order to reduce phase lag in the tracking control system and to reduce time delays in the seek or velocity control system of the disk drive. This affects the performance of the device in which the driver is being used. The command to the power driver is updated at a rate that is matched to the feedback information rate of the system. In a disk drive the feedback information rate is conventionally the servo sector rate. However, this rate is too slow to effectively compensate for the electrical time constant at the rate that the commands are provided by the main loop processor. A need exists for a system and method that allows the driver to correct at a much faster rate.

SUMMARY OF THE INVENTION

Briefly stated, the present invention involves a power driver for driving a signal on a load using a voltage-mode driver. A system processor generates commands indicating a programmed drive signal desired for the voltage-mode driver. A lead compensator, in the case of an inductive load, determines a compensation factor to compensate for an admittance function of the load. The compensated commands are coupled to the voltage-mode driver, such that the voltage-mode driver generates a voltage output based upon the compensated command.

In another aspect, the present invention involves a method of driving an electrical load, wherein the load has a characteristic admittance function. A voltage-mode driver is coupled generating a drive signal to the electrical load. Commands indicating a programmed voltage output desired from the voltage-mode driver are generated. At least one time lead compensation coefficient is determined canceling an electrical time delay associated with the load. The commands are modified using the at least one time lead compensation coefficient to produce a compensated command. The compensated command is supplied to the voltage-mode driver. A voltage output from the voltage-mode driver is generated based upon the compensated command.

DETAILED DESCRIPTION OF THE PREFERRED EMBODIMENTS

The present invention involves a control system and methodology in which a discrete time lead compensator comprising at least one pole and/or at least one zero, is added in the command path to a power driver circuit in a feed forward manner. A command generated by a controller is modified by the time lead compensator to generate a compensated command. The compensated command is used to control the power drivers. Because the compensated command can be processed at a rate much higher than the input command update rate (e.g., the servo sector rate in a disk drive system), the time lead compensator has sufficient bandwidth to effectively cancel the effects of the admittance function of the load.

The present invention is particularly described in terms of a disk drive system in which an inductive load, such as an actuator or voice coil motor, is being driven. However, the present invention more generally applies to applications for precision drive signal control using voltage-mode drive of complex-impedance loads. Complex impedance loads are loads that create one or more poles or zeros in their transfer (admittance) function such that load current does not continuously reflect voltage applied and/or behavior of devices and machines controlled by the load current. Hence, the present invention is readily adapted to control capacitive, inductive, and other complex impedance loads.

A compensation unit in accordance with the present invention is implemented in hardware or software is used to correct the command from the system processor before it is applied to the power drivers in a feed forward fashion. Although the present invention is described in terms of disk drive electronics and in particular to VCM drivers, the method is applicable to any voltage mode driver, switched mode or linear.

Figure 1:
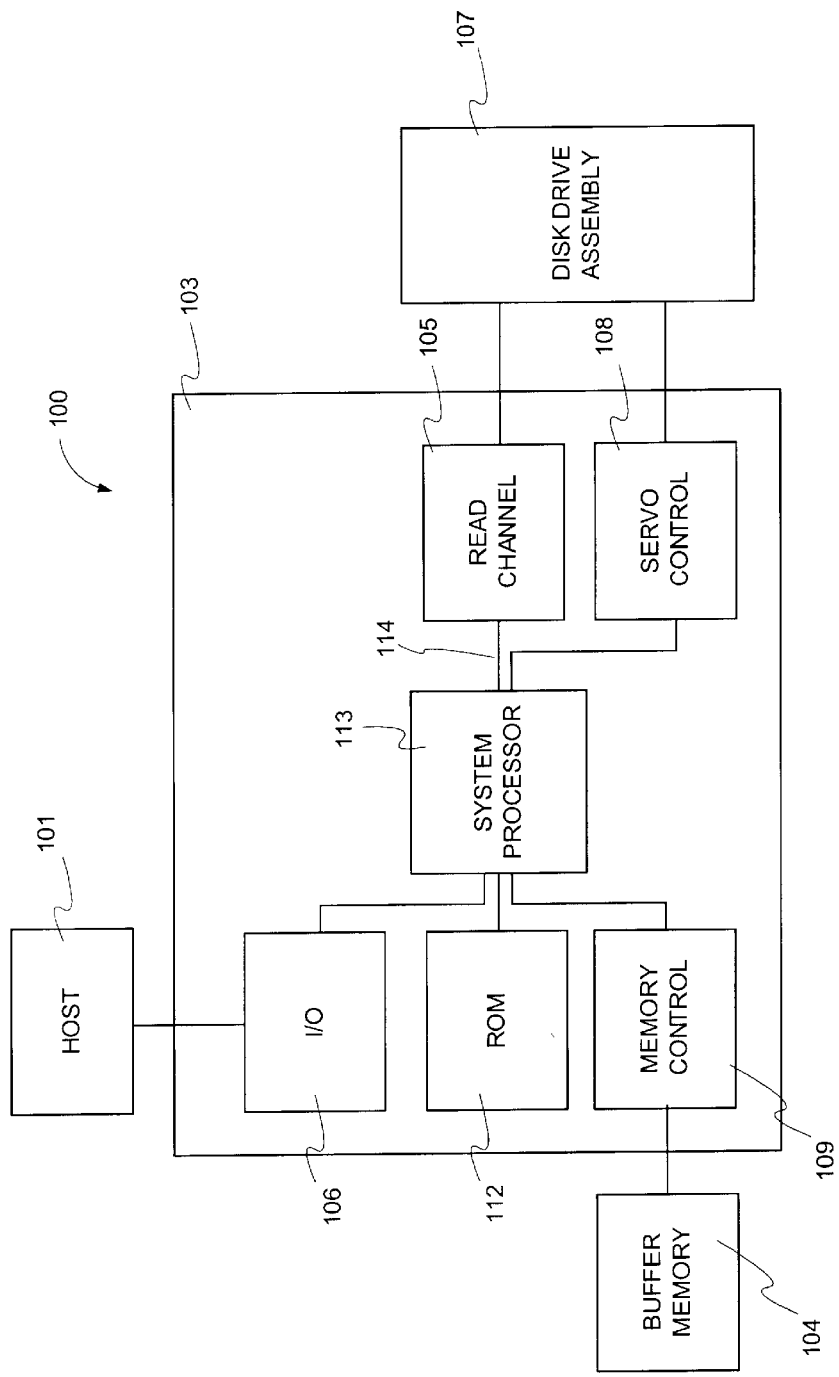
FIG. 1 shows in block diagram form a disk drive control system in which the present invention is implemented.

FIG. 1 illustrates in simplified form a drive system 100 in which the present invention is embodied. Disk drive system 100 includes a system processor 113 that processes requests and commands from a host computer 101 that direct drive system to perform specific behavior involving disk drive assembly 107. Examples include reading and writing data to disk drive assembly 107, providing state information such as defect tables, error status, and the like. Disk controller unit 103 includes data processing capacity as well as memory in the form of ROM 112 and buffer memory 104 to generate responses to received commands and requests. The generated responses return data, state information, and/or error codes depending on the particular operation being performed.

Disk drive assembly 107 implements physical mass storage typically on a plurality of magnetic disks and read/write head electronics for transferring data with the disks. Disk drive assembly 107 typically includes read channel hardware for preprocessing and amplifying data read from the magnetic media as well as a spin motor for spinning the disks, and voice coil motor (VCM) for positioning the read/write head electronics at specific locations with respect to the disk surface(s).

Servo control 108 generates drive signals that control the VCM and/or spin motors. These drive signals are in the form of precision current signals that drive the motors directly. In accordance with the present invention, servo control 108 includes a voltage-mode driver and supplies the drive signals using a power drive circuit such as an H-bridge transistor configuration. The present invention provides a system and method that avoid use of a precision current measurement resistor in a current minor loop, therefore eliminating one connection between servo control 108 and disk drive assembly 107.

Host 101 typically comprises a data processing device such as a personal computer, server, workstation or the like that requires access to bulk data storage capabilities of disk drive assembly 107. Host 101 sends write commands and data via controller 103 to write data onto the disks as well as read commands to retrieve previously written data from disks within disk drive assembly 107. On both read and write operations the data transmitted from the host 101 to the disk controller 103 includes an indication of a specific location or set of locations on the disk drive assembly that contains the data that is to be accessed.

The data that is exchanged through disk controller 103 is typically buffered in buffer memory 104 that is accessible via memory controller 109 and subsequently transmitted to disk assembly 107 or host 101. Buffer memory 104 is used to overcome differences between the speed at which host 101 operates as compared to the speed at which disk assembly 107 operates. In place of or in addition to buffer memory 104, a cache memory may be implemented by appropriate changes (e.g., tag management, hit/miss detection, and the like) to memory controller 109.

Figure 2:
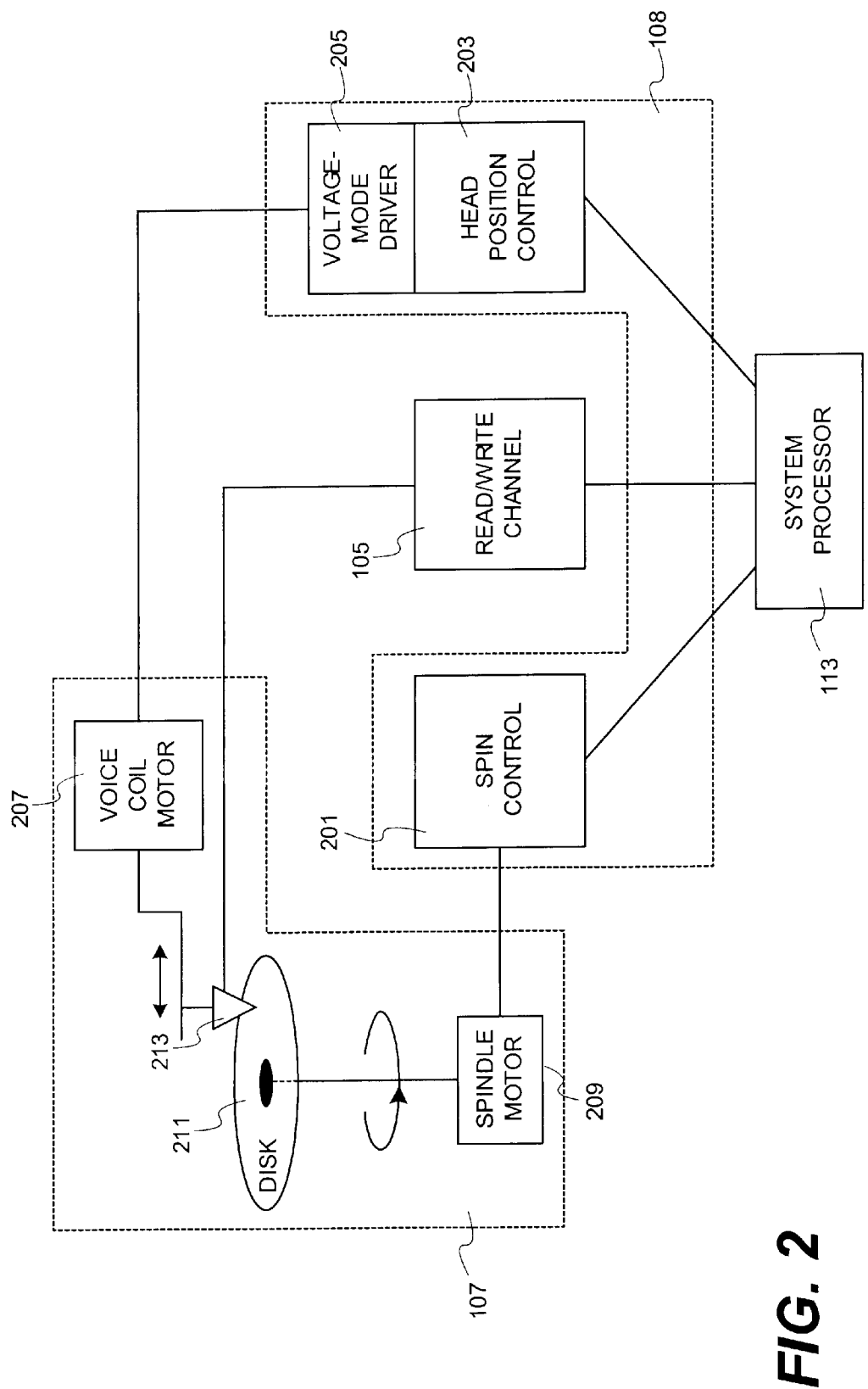
FIG. 2 shows a more detailed view of some of the components shown in FIG. 1.

FIG. 2 illustrates some of the components of FIG. 1 in greater detail. As shown in FIG. 2, servo control 108 includes spin control unit 201 that regulates the spin speed of spindle motor 209 in response to commands from system processor 113. Head position control unit 203 operates through voltage mode driver unit 205 to deliver controlled voltage signals in response to commands from system processor 113 to voice coil motor 207. These voltage signals cause voice coil motor unit 207 to move read/write head 213 into precision alignment with respect to the surfaces of disk 211. Although the voltage controlled driver configuration of the present invention is particularly applied to voice coil motor 207, it may be applicable to drive spin control unit 201 in certain applications.

Read channel circuit 105 communicates data and control information with the surface of disk 211. Control information such as servo control data, phase lock oscillator synchronization patterns, and servo bursts are encoded into portions of disk 211. This information is provided through read channel circuit 105 to system processor 113. System processor 113 uses this information to compute commands for spin control unit 201 and head position control unit 203. Dependent on the admittance function of the load, the computed commands will not result in ideal reactions, hence, the computed commands are modified by head position control unit 203 and/or voltage mode driver 205 so as to compensate for variations in the current/voltage relationship caused load impedance.

Figure 3:
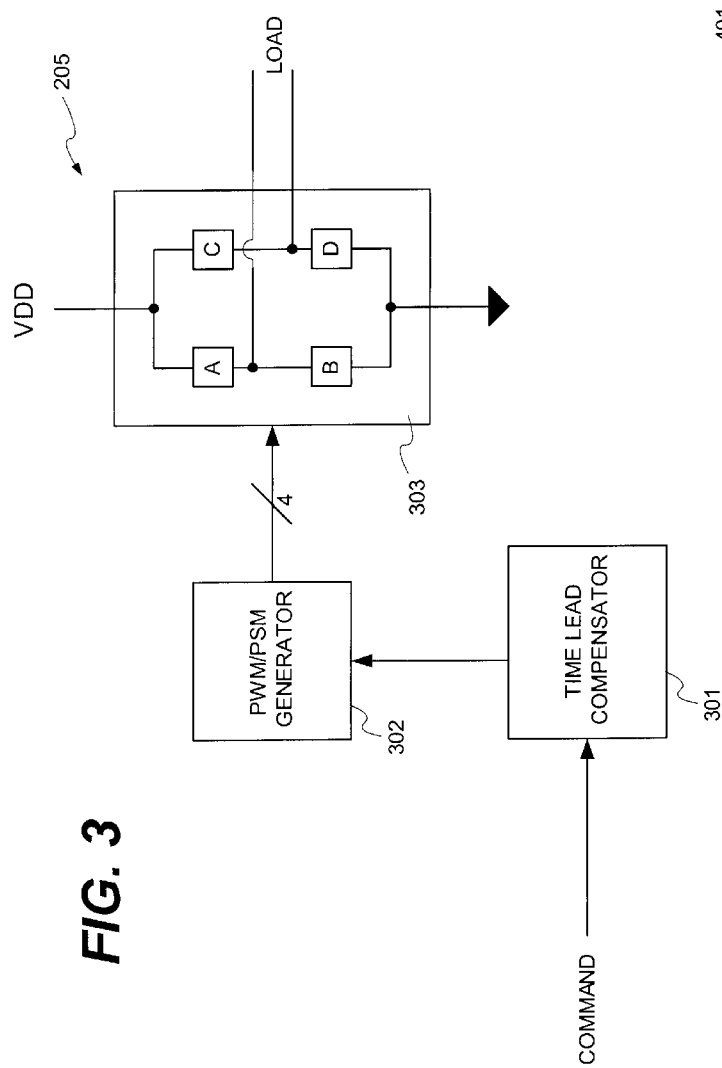
FIG. 3 illustrates in block diagram form components of a voltage mode driver circuit in accordance with the present invention.

FIG. 3 illustrates details of an exemplary voltage mode driver circuit 205 in accordance with an embodiment of the present invention. Pulse width modulation/phase shift modulation (PWM/PSM) generator 302 outputs, for example, four control signals where each signal controls the on/off state of one of switches "A", "B", "C", and "D" in power driver 303. Absent the time lead compensation unit 301 of the present invention, PWM/PSM generator 302 generates the control signals based upon the value of the command received from system processor 113. Power driver 303 is configured as an "H-bridge" driver circuit in the particular example, although other power driver configurations may be appropriate in some applications. Driver circuit 303 outputs a drive signal to the load that provides current to drive the load.

In essence, voltage mode driver 205 functions to receive a current command code, compensate the current command code for load impedance, and supply the compensated command code to PWM/PSM generator 302. In the particular examples, compensation unit 301 is referred to as a "lead" compensation unit because it produces a phase lead of a sinusoidal input at certain frequencies over that of a simple gain unit.

Time lead compensation unit 301 uses analog and/or digital filtering techniques to correct the command from the system processor 113 before it is applied to the power drivers 303 in a feed forward fashion. The switching sequence applies the VDD and ground to the terminals of the load such that the average value of the voltage is proportional to the compensated command. The steady state load current is proportional to the command level. The time response of the load current depends on the choice of coefficients in the time lead compensation unit 301 and the characteristics of the load. In general the current rate of change for a change of input command will be faster than in prior devices.

This correction can be made at a rate much higher than the input command update rate so that several compensated commands may be computed for each current command received. This higher compensation rate enables the system in accordance with the present invention to effectively compensate the lag in the admittance function of the load. For example, the current minor loop in prior drivers may effectively shift the 8.3 KHz corner frequency to about 20 KHz. The feedback loop forces a faster rate of change of load voltage than requested by the command in order to compensate for the lagging current in the load for an applied load voltage. The present invention inserts a lead compensator in the command path that implements a lead or zero at 8.3 KHz and a lag or pole at 20 KHz or above. This is possible because the driver signal processing (e.g., dedicated logic or MAC/processor system) is operating at a sample rate of, for example, 50 KHz or above. Continuous analog circuits also could be used, but are a less preferred implementation.

Figure 4:
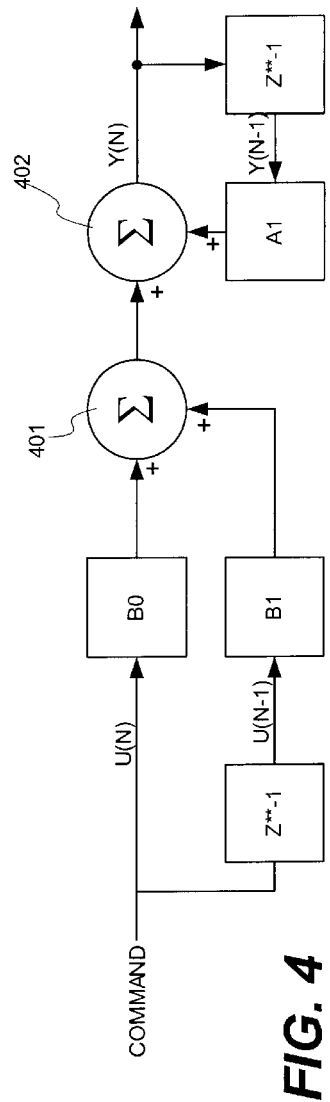
FIG. 4 shows the structure of a lead compensator circuit shown in FIG. 3 in greater detail.

Lead compensation of the command is implemented in the time lead compensator block 301 in FIG. 4. Coefficients (e.g., b0, b1, and a1 in FIG. 4) are computed for a particular load's admittance function either empirically or mathematically. The coefficients for the discrete time lead compensator would be loaded into compensator unit 301 before the compensator was run by the system processor. These values depend on the characteristics of the load and how much compensation is desired. A variety of techniques, such as bilinear transformation, are available to determine coefficients that implement a particular frequency response in digital components, based on a linear representation.

In actual implementation, all of the calculations relating to the previous input, U(N−1), and previous output, Y(N−1), can be preprocessed and just added, via blocks 401 and 402, for example, to the new scaled input, U(N), when it is available. The coefficients (B0=+1.625, B1=−0.511, and A1=−0.114), which are provided by way of example only, are shown for an example in which the sampling frequency (Fs) is 50 KHz, the frequency of the lead or zero is at 8.3 KHz (selected to cancel the lead in the load admittance function), and the frequency of the pole or lag is at 20 KHz which is typical of a current minor loop architecture bandwidth. This would allow repacing a CML, with its extra pin, sense resistor, and current sense amp with the present invention. Higher bandwidths could be achieved depending on system requirements and load characteristics. As noted above, the coefficients may be determined by a method known as bilinear transformation. In this method a lead compensator would be described mathematically in the "s" (frequency) domain (Laplace Transform of a frequency response). This is then transformed into the "z" domain and factored into a difference equation. The difference equation for the compensator shown in FIG. 4 is:

$$Y(N)=b0*U(N)+b1*U(N-1)+a1*Y(N-1)$$

where b1 and a1 are negative values. Y(N) is the present compensated output, Y(N−1) is the previous output, U(N) is the present input (i.e., command value), and U(N−1) is the previous input.

The invention comprises using the lead compensator (or any compensator discrete or continuous that compensates the load admittance) in a feed forward manner to compensate for the electrical time constant of a complex impedance load. This is needed where current feedback is not available such as in the switched mode, voltage mode driver.

The functions in the time lead compensator unit 301, shown as a preferred embodiment may be implemented in analog/sample-and-hold circuitry, digital filters, or in firmware executed in a microprocessor or microcontroller. If a dedicated multiply and accumulate (MAC) processor system is used for time lead compensator unit 301, other functions such as the PWM/PSM generator 302, correction for VDD changes, VCM back EMF correction, and auxiliary functions such as notch filters and other system functions could all be implemented by this processor. The extent of the functions would be determined by the instruction rate of this power driver processor system.

In preferred implementations, servo control circuit 108 is implemented in an integrated circuit having a set of one or more pins dedicated to providing a drive signal to voice coil motor 207. The IC will require a drive signal output pin, and regulating the output of the drive signal extra pins necessary to implement current minor loop regulation are eliminated. Moreover, the present invention is readily applicable to any drive electronics where it is desirable to control the output with precision, but also desirable to eliminate extra pins needed for the precision regulation.

Figure 5:
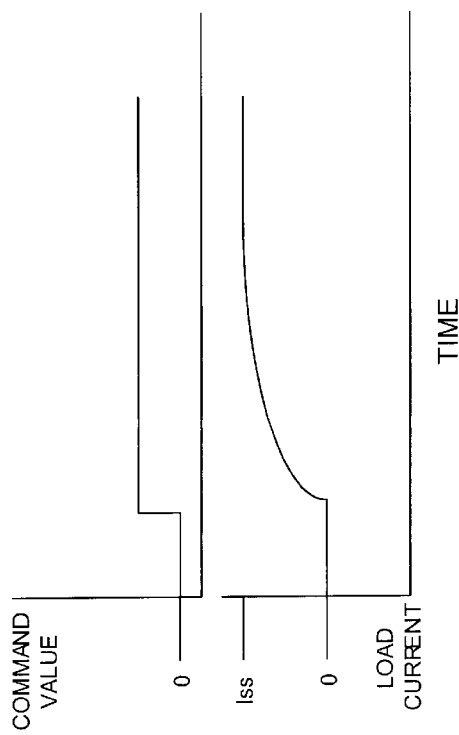
FIG. 5 shows a waveform diagram illustrating operation of a prior art system.
Figure 6:
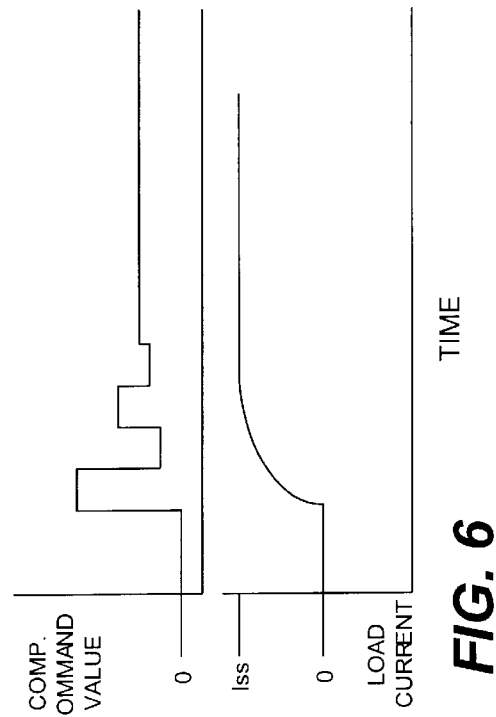
FIG. 6 shows a waveform diagram illustrating operation of the time constant compensated operation in accordance with the present invention.

FIG. 5 (prior art) and FIG. 6 illustrate by comparison the performance of the time constant correction in accordance with the present invention. The upper waveform in FIG. 5 illustrates a change in command value generated by a system processor. In conventional systems, the command value changes only once per each servo field, and so the frequency of change is limited by the number and frequency of servo fields on the disk media. The change in command value is translated into a change in voltage drive applied to the load. The lower portion of FIG. 5 shows a typical responsive load current that occurs for a given change in command value. It can be seen that the drive current ramps up slowly so that it reaches 63% of its steady state current Iss after one time constant, and takes several time constants to actually reach Iss.

In contrast, the waveforms illustrating the present invention in FIG. 6 show that the compensated command value can change at a higher frequency than the servo sector rate. Preferably, the rate of change of the compensated command value is independent of the servo sector rate and is decided as a matter of design choice to meet the needs of a particular application. As a result, the compensated command value may change many times between each change in the generated command value as shown in FIG. 6. As a result, the shape of the load current curve can be controlled with precision to maximize the rate of change, or provide a controlled rate of change that results in proper positioning of the read/write head with respect to the media.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of driving a voice coil motor (VCM) comprising:
   providing a voltage-mode driver coupled to the power supply and generating a drive signal to the VCM;
   generating commands indicating a programmed voltage output desired from the voltage-mode driver;
   determining at least one lead compensation coefficient compensating for an electrical time delay associated with the (VCM);
   modifying the commands using the at least one time lead compensation coefficient to produce a compensated command;
   supplying the compensated command to the voltage-mode driver; and
   generating a voltage output from the voltage-mode driver based upon the compensated command.

2. The method of claim 1 wherein the at least once compensation coefficient inserts a zero at a lag corner frequency of a transfer function of the VCM.

3. The method of claim 1 wherein the at least once compensation coefficient is selected to cause a transfer function of the VCM to approximate a current minor loop feedback control system.

4. The method of claim 1 wherein the VCM comprises an actuator in a disk drive system, and the act of modifying the commands is performed at a rate faster than the servo sector rate of the disk drive system.

5. The method of claim 1 wherein the act of generating a voltage comprises generating a pulse width modulated output wherein the duty cycle is responsive to the compensated command.

6. The method of claim 1 wherein the act of generating a voltage comprises generating a phase shift modulated output wherein the duty cycle is responsive to the compensated command.

7. The method of claim 1 further comprising:
   receiving a present command value;
   storing a previous command value;
   scaling the present and previous command values;
   storing a previous compensated command value;
   scaling the previous compensated command value; and
   adding the scaled present command value, scaled previous command value, and scaled previous compensated command value to determine a present compensated command value.

8. The method of claim 7 wherein steps of storing, scaling and adding are implemented by analog signal processing processes.

9. The method of claim 7 wherein steps of storing, scaling and adding are implemented by digital signal processing processes.

10. The method of claim 7 wherein steps of storing, scaling and adding are implemented by processes executing in multiply and accumulate (MAC) logic executing firmware instructions.

11. A power driver comprising:
a voltage-mode driver coupled to the power supply voltage and generating a drive signal to a voice coil motor (VCM) load;
a system processor configured to generate commands indicating a programmed voltage output desired from the voltage-mode driver;
a compensator that determines a correction factor based on admittance of the load;
a connection coupling the compensated command to the voltage-mode driver, wherein the voltage-mode driver generates a voltage output based upon the compensated command.

12. The system of claim 11 wherein the lead compensator implements a zero to compensate for the admittance function of the load.

13. The system of claim 11 wherein the lead compensator implements a pole to compensate for the admittance function of the load.

14. The system of claim 11 wherein the lead compensator comprises an analog filter function.

15. The system of claim 11 wherein the lead compensator comprises a digital filter.

16. The system of claim 11 wherein the lead compensator comprises firmware-defined processes executing in a processor.

17. The system of claim 11 wherein the voltage-mode driver comprises a pulse width modulation controller, wherein the duty cycle is responsive to the modified command.

18. The system of claim 11 wherein the voltage-mode driver comprises a phase shift modulation controller, wherein the duty cycle is responsive to the modified command.

19. The system of claim 11 wherein the combination mechanism further comprises:

means for storing a previous command;
means for storing a previous compensated command;
means for combining the previous command, the previous compensated command, and a present command to determine a present compensated command.

20. The system of claim 19 wherein the means for combining includes at least one scaling block coupled to scale at least one of the present command, previous command and present compensated command by a scaling coefficient.

21. The system of claim 20 wherein the scaling coefficient is configurable to adapt to the admittance function of the load.

22. A disk drive system comprising:
a disk having a surface capable of storing data;
a read/write head configured to read and write data to specified locations of the disk surface;
a voice coil motor coupled to the read write head and responsive to a drive signal to position the read/write head at the specified locations;
a voltage-mode driver coupled to receive commands and generate the drive signal to the voice coil motor;
a system processor configured to generate commands indicating a programmed drive signal desired from the voltage-mode driver;
a lead compensator that determines a correction factor based on admittance of the load;
a combination mechanism coupled to the lead compensator and the system processor receive the correction factor and the generated command and generate a compensated command in a feed forward manner using the correction factor;
a connection coupling the compensated command to the voltage-mode driver, wherein the voltage-mode driver generates a voltage output based upon the compensated command.

23. The disk drive system of claim 22 wherein the lead compensator is implemented as processes within the power processor.

* * * * *